United States Patent [19]

Yagi et al.

[11] Patent Number: 4,813,647
[45] Date of Patent: Mar. 21, 1989

[54] ELECTROMAGNETIC ACTUATOR FOR CONTROLLING FLUID FLOW

[75] Inventors: Hirokazu Yagi; Shiro Maeda; Yoshiaki Kondo, all of Kariya, Japan

[73] Assignee: Nippondenso Co., Ltd., Kariya, Japan

[21] Appl. No.: 126,076

[22] Filed: Nov. 24, 1987

[30] Foreign Application Priority Data

Nov. 24, 1986 [JP] Japan ................................. 61-280123
Sep. 3, 1987 [JP] Japan ................................. 62-220867

[51] Int. Cl.$^4$ ............................................. F16K 31/06
[52] U.S. Cl. ............................... 251/129.05; 251/368; 251/129.17; 251/129.19
[58] Field of Search ...................... 251/129.05, 129.19, 251/129.08, 129.17

[56]  References Cited

U.S. PATENT DOCUMENTS 3,914,952 10/1975 Barbier ...................... 251/129.08 X
4,245,815 1/1981 Willis .............................. 251/129.08
4,361,309 11/1982 Sozabe ........................... 251/129.08
4,411,406 10/1983 Inada et al. ................. 251/129.08 X

FOREIGN PATENT DOCUMENTS 60-1483    7/1985 Japan .
60-139983  7/1985 Japan .
61-73881   5/1986 Japan .

Primary Examiner—Arnold Rosenthal
Attorney, Agent, or Firm—Cushman, Darby & Cushman

[57]  ABSTRACT

An electromagnetic actuator for controlling an amount of an intake air for an internal combustion engine employs an elastic member for biasing a valve body toward a valve seat by a predetermined setting force. The repulse of the valve body that is caused when the valve body hits the valve seat is absorbed by the elastic member. Since the elastic member is located behind the valve body, the elastic member of the present invention has no tendency to adhere the valve body on the valve seat.

9 Claims, 6 Drawing Sheets

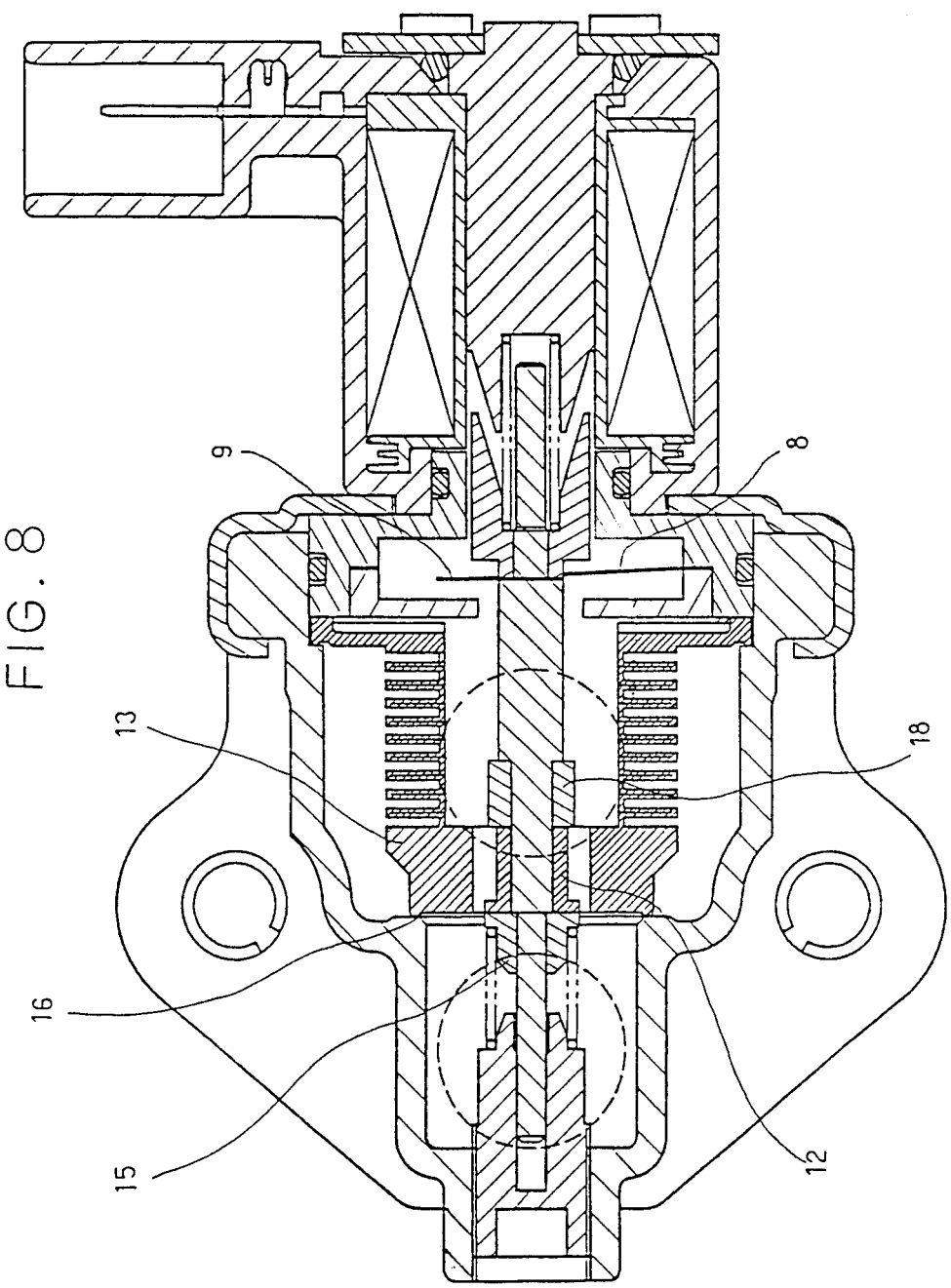

ELECTROMAGNETIC ACTUATOR FOR CONTROLLING FLUID FLOW

BACKGROUND OF THE INVENTION

1. Field of the Invention

The present invention relates to an electromagnetic actuator for controlling the amount of fluid passing therethrough. The actuator of the present invention can be used for controlling the amount of intake air for an internal combustion engine, for example.

2. Description of the Prior Art

A solenoid valve having a valve body which opens and closes an air path based on whether or not the solenoid is energized is incorporated into an electromagnetic actuator for controlling an idling speed of an internal combustion engine. The solenoid coil is energized in accordance with a signal having a duty ratio. The valve body changes its position between an open position and a closed position in a short time in response to that signal so that the air passing through the valve body is substantially continuously controlled.

The conventional type of the electromagnetic actuator, however, has an operational difficulty. An uncontrolled amount of air, the volume of which is larger than a predetermined volume intended to pass when the valve is opened in the normal manner, passes through the valve body when the valve body opens slightly as (shown by dotted line A in FIG. 2). This effect is caused by a repulsive force being generated when the valve body hits the valve seat, i.e. the valve body tends to "bounce" when it closes. The repulsive force causes the valve body to move further from the valve seat than it would move if controlled by the duty ratio alone.

In order to restrain the hitting of the valve body, a soft material such as rubber can be coated on the surface of the valve body and/or on the valve seat. Adding a rubber coating, however, makes the manufacturing process of the valve considerably more complicated and raises the cost of production. Furthermore, the soft material provided between the valve body and the valve seat may cause the valve body to adhere to the valve seat. Accordingly, accurate control of the lift of the valve body cannot be obtained.

SUMMARY OF THE INVENTION

The present invention overcomes this problem by providing an actuator which can accurately control an amount of fluid flow in accordance with the duty ratio of a signal applied to a solenoid coil. The repulsive force that occurs in prior art devices is eliminated. The lift of the valve body is accurately controlled even when the valve body is lifted only slightly from the valve seat.

In order to function in the manner described above, the present invention provides a new structural arrangement for an electromagnetic actuator. The actuator's valve body is connected to a movable core which can be moved by the solenoid coil in such a manner that the valve body can slide along with the movable core. The movable core and valve body are arranged such that there is a predetermined gap formed between them. The sliding of the valve body along with the movable core is limited by a limiting piece provided on the movable core. An elastic member, such as, for example, a spring, is provided between the valve body and the movable core for biasing the valve body toward the limiting piece. The actuator according to the present invention preferably uses a valve body and a valve seat which are formed of a rather rigid material. Even though the use of a rigid material has a tendency to cause the valve body to be repulsed upon impact with the valve seat, any repulsive force of the valve body is absorbed by the elastic member. The elastic member provided between the valve body and the movable core "replaces" the rubber coating on the surface of the valve body in prior art devices and does not have the disadvantages associated with the rubber coating, as discussed above.

The actuator of the present invention can absorb the repulse of the valve body even though no rubber is coated on the surfaces of the valve body and the valve seat. Since the actuator of the present invention needs no rubber coating on the surfaces of the valve body and valve seat, the valve body will not adhere to the valve seat. Accordingly, the actuator of the present invention can control the lift of the valve body even when the valve body is slightly lifted from the valve seat.

The valve body of the actuator according to the present invention is preferably made from hard resin material. Thus, the valve body can be used as a part of a bellows arrangement. The production of the actuator according to the present invention can be even further reduced when the valve body and the bellows are formed integrally.

BRIEF DESCRIPTION OF DRAWINGS

FIGS. 6–8 are sectional views showing the actuator according to the present invention.

DETAILED DESCRIPTION OF THE PREFERRED EMBODIMENT

Figure 1:
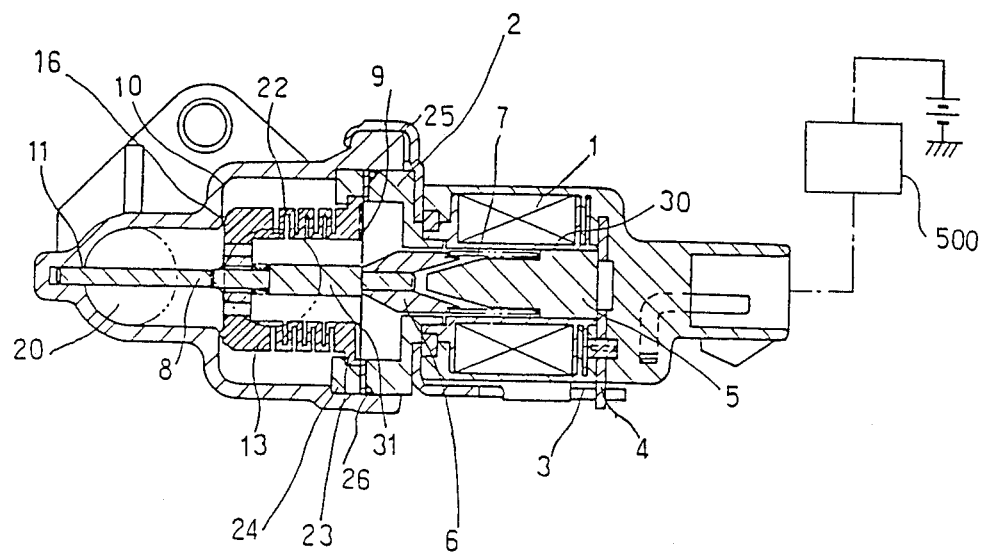
FIG. 1 is a sectional view of an actuator according to the present invention.

FIG. 1 is a sectional view of an actuator according to the present invention. The actuator according to the present invention includes a housing 10 which is preferably made of hardened synthetic resin material, such as polyethylene terephthale. An air passage 20 intended to pass intake air flowing toward an internal combustion engine is formed within the housing 10. A valve seat is provided within the housing 10. A valve body 13, preferably made of a hardened synthetic resin material, such as four (4) fluoride ethylene is provided within housing 10 in such a manner that the valve body 13 faces a valve seat 16. A ring like projecting portion 50 is formed on the surface of valve body 13 facing valve seat 16.

Valve seat 16 is formed as a cup shape so that a side wall portion of the valve body is used as a bellows 22 and the end portion of the valve body is fixed to a magnetic plate 2 via a fixing ring 24. The magnetic plate 2 is fixed to the housing 10 via a connecting plate 25. An 0-ring 26 is provided between the magnetic plate 2 and the housing 10 in order to seal the housing 10.

A cylindrical solenoid coil 1 is wound on a case 30 preferably made of a synthetic resin material. A stator core 5 and a movable core 6 which are made of magnetic material are provided within the case 30 in such a manner that the end portion of the stator core 5 faces an end portion of the movable core 6. A first coil spring 7 is provided between the stator core 5 and the movable core 6 for biasing the movable core 6 away from the stator core 5. A magnetic plate 4 is connected to another end portion of the stator core 5 and a yoke made of magnetic material covers the solenoid coil in order to complete a flux circuit around the solenoid coil 1.

Since the flux circuit is formed by the yoke 3, the plate 4, the stator core 5 and the movable core 6, the magnetic force is generated between the movable core 6 and the stator core 5 so that the movable core 6 moves rightward in FIG. 1 against the biasing force of the first coil spring 7 when the solenoid coil 1 is energized.

The movable core 6 is held by a leaf spring 9 the end of which is held between the fixing ring 24 and the magnetic plate 2. A shaft 31 is formed integrally with the movable core 6 so that the movement of the movable core 6 is transmitted to the shaft 31. Thus, in this embodiment, the shaft may be regarded as a part of the movable core 6. The shaft 31 is slidably supported by shaft guide 11 formed within the housing 10 so that the movable core 6 and the shaft 31 are held by the shaft guide 11, the coil spring 7 and the leaf spring 9.

Figure 3:
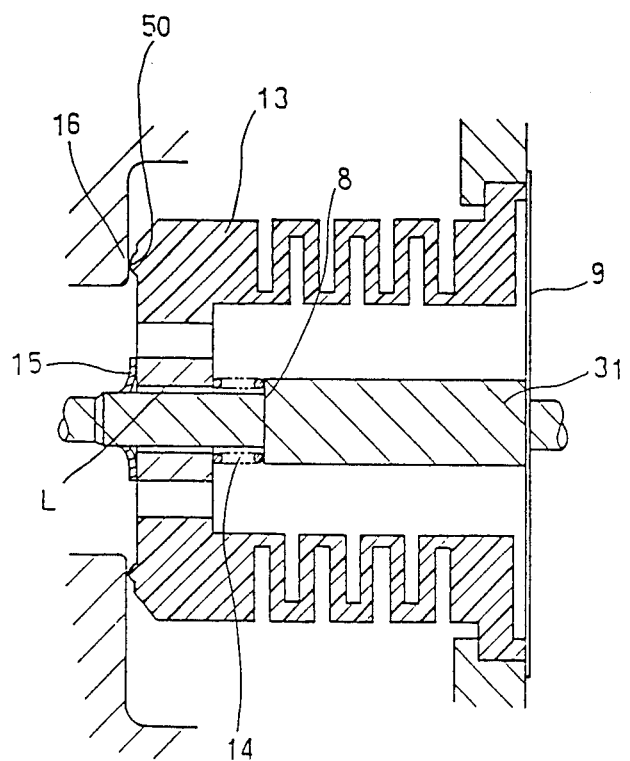
FIG. 3 is a sectional view showing a part of the actuator shown in FIG. 1.

As shown in FIG. 3 which is an enlarged sectional view of FIG. 1, the shaft 31 is connected to the valve body 13 in such a manner that predetermined gap L is formed between the inner surface of the valve body 13 and the outer surface of the shaft 31 so that the valve body 13 can slide along with the shaft 31. A limiting piece 15 is fixed to the shaft 31 for limiting the leftward movement of the valve body 13.

A second coil spring 14 is provided between a shoulder portion 8 which is formed on the shaft 31 and the valve body 13 for biasing the valve body 13 toward the limiting piece 15. The biasing force of the second coil spring 14 is rather small in order to permit the valve body 13 to vibrate. The biasing force of the second coil spring 14, according to this embodiment of the invention, is about 30g, for example, which is about one tenth of that of the first coil spring 7. The smaller of the biasing force of the second coil spring 14 the better, and ideally the biasing force of about 10 g is preferred. However, the valve body 13 opens the passage 20 by the pressure of the air within the housing 10 if the biasing force of the second coil spring 14 is too small. Accordingly, the second coil spring 14 must provide a biasing force which can hold the valve body 13 against the air pressure.

The operation of the actuator described above will now be explained. Since the magnetic force is generated between the movable core 6 and the stator core 5 when the current is supplied to the solenoid coil 1, the movable core 6 and the shaft 31 move rightward in FIG. 1. The movement of the shaft 31 transmits to the valve body 13 via the limiting piece 15 so that the valve body 13 moves away from the valve seat 16.

Figure 2:
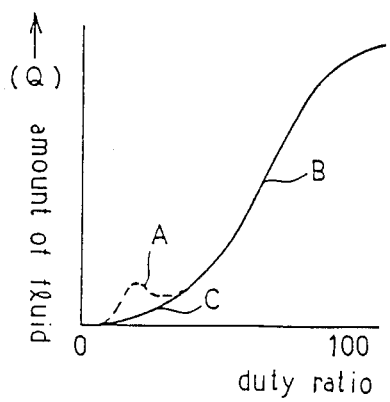
FIG. 2 is a diagram indicating the operation of the actuator.

Accordingly, the energizing of the solenoid coil 1 makes the valve body 13 move apart from the valve seat 16. As shown by solid line B in FIG. 2, the amount of the air passing through the valve seat continuously increases in accordance with the duty ratio of the signal applied to solenoid coil 1. The current flowing through the solenoid coil 1 is controlled by a controlling device 500. The duty ratio is the ratio between the time when the current is supplied to the solenoid coil 1 and the time when no current is supplied to the solenoid coil 1. The duty ratio of the present embodiment is about 160 Hz.

Since the lift of the valve body 13 is controlled by the duty ratio, the valve body 13 vibrates with an amplitude of about 0.1 mm. The valve body 13 hits the valve seat 16 for an extremely short time during each cycle. As described above, in prior art devices, the repulse of the valve body 13 may cause serious problem due to the amount of the air passing through the valve seat. The actuator according to the present invention, however, can absorb the repulse of the valve body 13 by the second coil spring 14 provided behind the valve body 13. Accordingly, the actuator of the present invention can control the amount of the air as shown by solid line C in FIG. 2 even though the lift of the valve body is small and the valve body is in contact with the valve seat 16 for only a short time.

Figure 4:
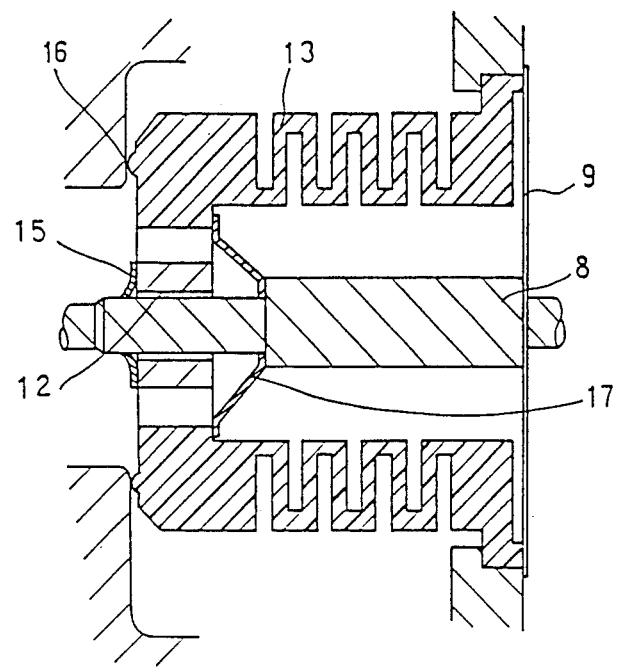
FIGS. 4 and 5 are sectional views showing alternative embodiments of a portion of the actuator according to the present invention.
Figure 5:
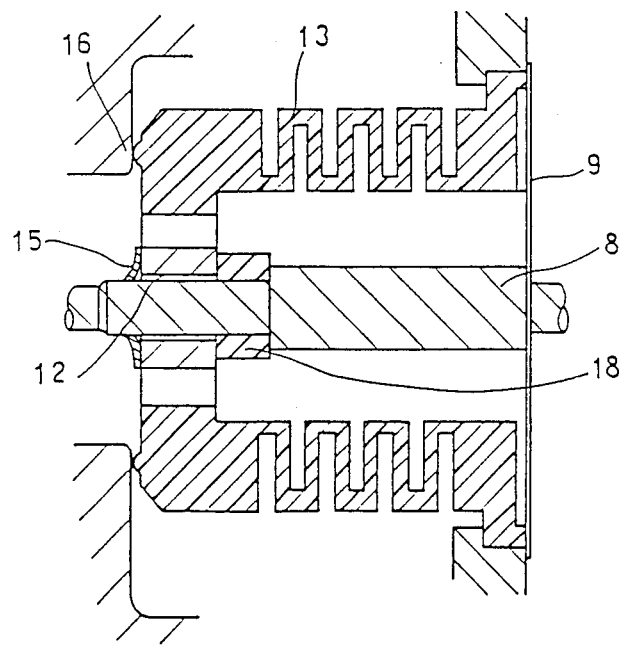

Though the actuator of the above described embodiment employs the coil spring 14 as the elastic member, another material such as leaf spring 17 shown in FIG. 4 and a rubber element 18 shown in FIG. 5 can be used instead of the coil spring 14.

Figure 6:
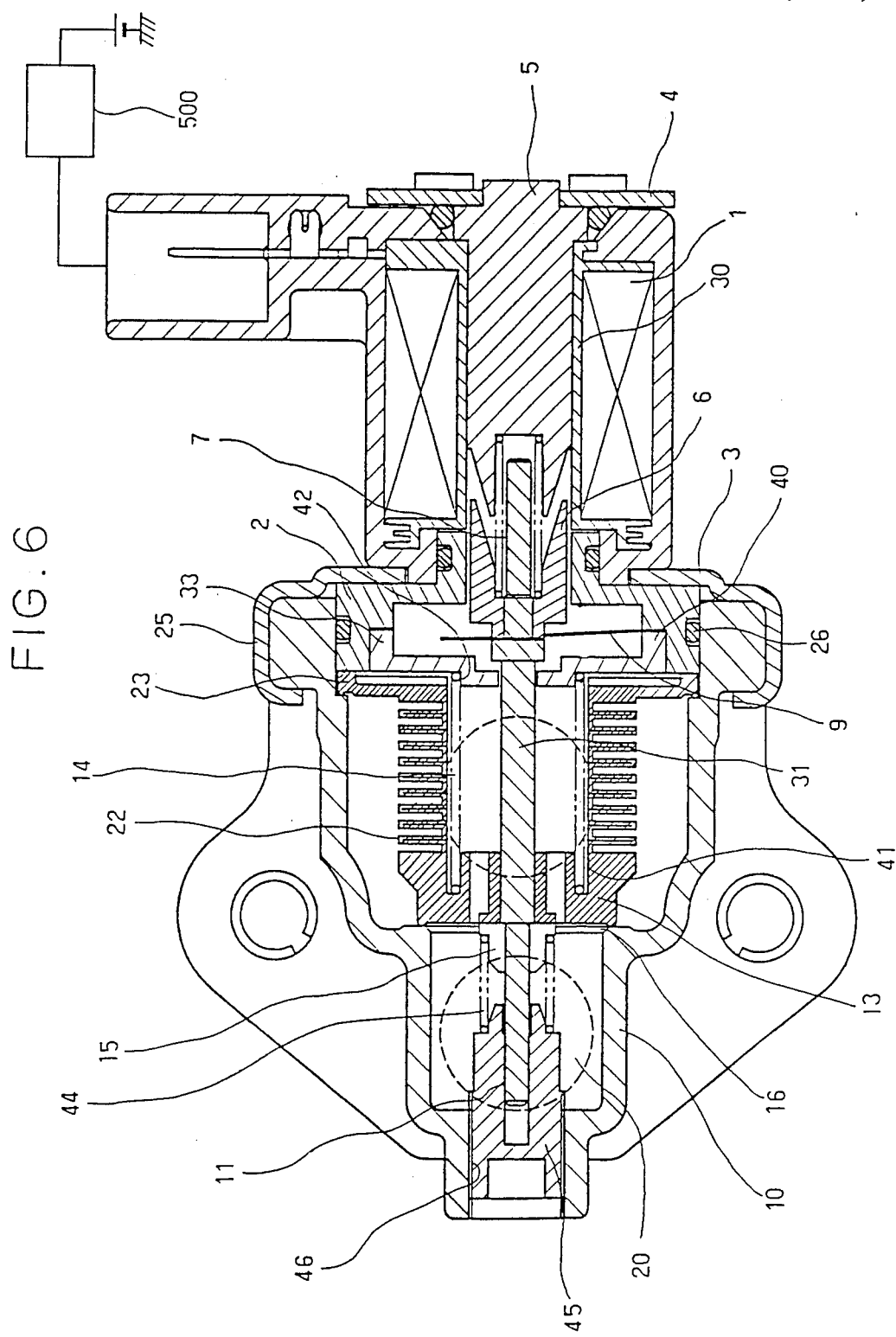

FIG. 6 shows another embodiment of an actuator according to the present invention. This embodiment employs a holding plate 40 made of aluminum alloy and a leaf spring 9 held between the holding plate 40 and the magnetic plate. One end portion of the second coil spring 14 is held within an annular holding groove 41 formed on the inner surface of the valve body 13 and another end portion of the second coil spring is held around a cylindrical shoulder 42 formed at the center portion of the holding plate 40. Since the other end portion of the second coil spring of the actuator shown in FIG. 6 is held at the predetermined position, the biasing force of the second spring 14 is varied in accordance with the movement of the movable core 6. Accordingly, the magnetic force generated between the movable core 6 and the stator core 5 is controlled not only by the first coil spring 7 but also by the second coil spring 14, so that the setting force of the first coil spring 7 of the actuator shown in FIG. 6 can be smaller than that of the first coil spring 7 of the actuator shown in FIG. 1. The setting force of the second coil spring of the actuator shown in FIG. 6 is about 100 g and the spring coefficient is about 40 g/mm.

The end portion of the bellows 22 of the actuator shown in FIG. 6 is not fixed by the fixing ring 24 but by the housing 2 and the magnetic plate 2. Therefore, the bellows 22 of this embodiment can be fixed easily.

The actuator shown in FIG. 6 employs not only the first coil spring 7, and the second coil spring 14, but also a third coil spring 44, one end of which is connected to the central convex portion of the limiting piece 15 and another end portion of which is fixed to the central cylindrical portion formed at the center portion of an adjust screw 45. The shaft guide 11 by which the shaft 31 is slidably held is formed at the center portion of the adjust screw 45 and a thread portion 46 by which the adjust screw 45 is connected to the housing 10 in such a manner that the position of the adjust screw 45 can be modulated is formed at the outer surface of the adjust screw 45 so that the setting loads of the third coil spring and also the first and second coil springs 7 and 14 are modulated when the position of the adjust screw 45 is modulated. Accordingly, the third coil spring 44 is used for modulating the setting loads of the first coil spring 7 and the second coil spring 14. The spring coefficient of the third spring 44 is small than those of the first and second springs 7 and 14.

Figure 7:
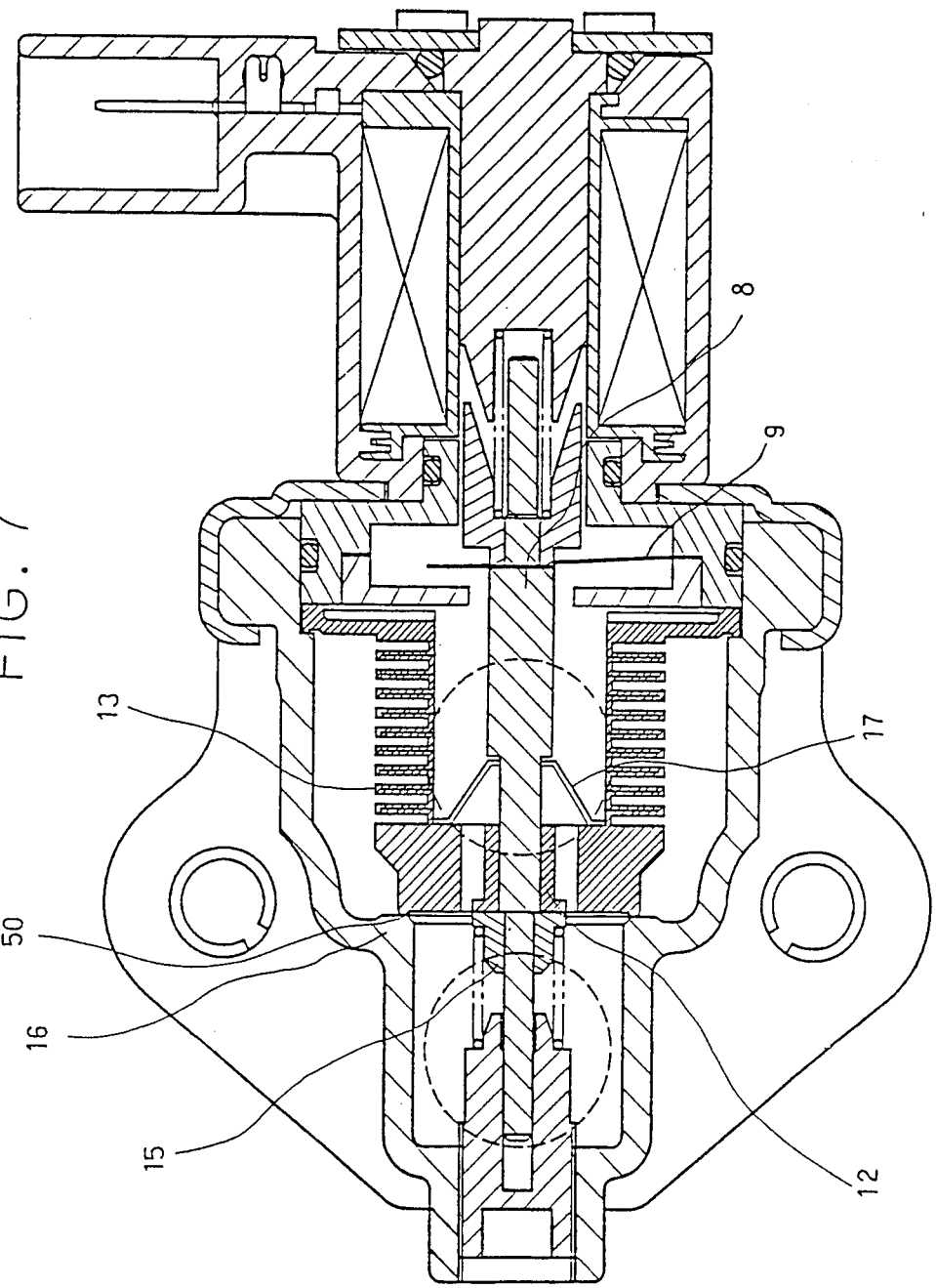

FIGS. 7 and 8 show other alternative embodiments of the invention. The actuator shown in FIG. 7 employs leaf spring 17 instead of the second coil spring 14. The actuator shown in FIG. 8 employs the rubber bush 18 instead of the second coil spring 14. All other elements in the FIGS. 7 and 8 embodiments are the same as those of the actuator shown in FIG. 6. As described above, any elastic member biasing the valve body 13 toward the valve seat by a predetermined small elastic force can be used as the elastic member of the present invention. Though the first coil spring 7 of the above described elements biases the valve body toward the valve seat, the coil spring can be used for biasing the valve body toward the opposite direction of the valve seat. Namely, the coil spring making the valve body 13 apart from the valve seat 16 when the solenoid coil 1 is not energized can be used for the present invention.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed:

1. An electromagnetic actuator for controlling fluid flow comprising:
   a housing having a fluid passage therein and a valve seat portion provided around the fluid passage;
   a substantially rigid valve body positioned within the housing in such a manner that the valve body shuts the fluid passage when the valve body is seated on the valve seat and opens the fluid passage when the valve body is unseated from the valve seat;
   a solenoid coil for generating a magnetic force when it is energized;
   a moveable core arranged to move along an axis thereof when the magnetic force is applied, the valve body being connected with the moveable core in such a manner that the valve body can slide along the axis of the core;
   a first elastic member biasing the moveable core in a direction opposite to that of the magnetic force by a first biasing force;
   a second elastic member biasing the valve body toward the valve seat by a predetermined second biasing force;
   a limiting piece fixed on the moveable core for limiting movement of the valve body caused by the second biasing force when the valve body is unseated from the valve seat;
   a controlling device for controlling a duty ratio of an energizing period of the solenoid coil to an unenergizing period of the solenoid coil in order to control an amount of the fluid passing between the valve body and the valve seat;
   a third elastic member abutting the limiting piece for biasing the moveable core in a direction opposite to that of the second elastic member by a third biasing force;
   an adjusting means holding the third elastic member for adjusting the third biasing force so that the first biasing force, the second biasing force and the third biasing force are functionally modulated by the adjusting means.

2. An electromagnetic actuator according to claim 1, wherein
   the second elastic member biases the valve body and the movable core in a direction opposite to that of the magnetic force; and
   said second elastic member controls the movement of said movable core in cooperation with the first elastic member.

3. An electromagnetic actuator according to claim 1, further comprising bellows formed integrally with the valve body, and
   wherein the valve body has a hole therein through which the fluid within the fluid passage is introduced into a closed space within the bellows for canceling a pressure difference across the valve body.

4. An electromagnetic actuator according to claim 3, wherein the valve body has a ring shaped convex portion protruding therefrom toward the valve seat so that the ring shaped convex portion is seated on the valve seat when the valve body is fully moved toward the valve seat.

5. An electromagnetic actuator according to claim 1, wherein the movable core is supported by the housing in such a manner that the moveable core can slide along an axis thereof.

6. An electromagnetic actuator according to claim 1, wherein the valve body is unseated from the valve seat when the movement of the movable core caused by the energization of the solenoid coil is transmitted via the limiting piece.

7. An electromagnetic actuator according to claim 1, wherein the second elastic member is a coil spring.

8. An electromagnetic actuator according to claim 1, wherein the second elastic member is a roof spring.

9. An electromagnetic actuator according to claim 1, wherein the second elastic member is a rubber bush.

* * * * *